Nov. 21, 1933.  T. H. GEORGE  1,936,160
CENTER TESTING INDICATOR
Filed May 28, 1930

INVENTOR.
Theodore H. George.
BY
Andrew Meureuther
ATTORNEY.

Patented Nov. 21, 1933

1,936,160

UNITED STATES PATENT OFFICE 1,936,160

CENTER TESTING INDICATOR

Theodore H. George, Cicero, Ill.

Application May 28, 1930. Serial No. 456,706

4 Claims. (Cl. 33—172)

My invention relates to center testing indicators and has for its object the production of a center testing indicator for use in lathes, milling, grinding and other machines which may be associated with any of the usual types of dial gauges and which will enable the operator to test the lathe center as well as to accurately and readily centrally locate the piece on the face or operating plate of the lathe or similar machine, or quickly determine how much said piece of work must be moved to bring it to its central location, or how much must be cut off the exterior surface of a cylindrical piece to bring its cylindrical surface true with the center line on which the piece is to be surfaced, as for instance, in a piece that was previously turned off in a lathe and then hardened and mounted in a grinding machine to be ground down to proper size.

A further object of the invention is the production of a center testing indicator of this character which is simple in construction, reliable and efficient in operation, easily read and very sensitive in action and one that is inexpensive to make.

I accomplish these results by the means shown in the accompanying drawing in which.

Similar reference numerals indicate similar parts throughout the several views.

Figure 3:
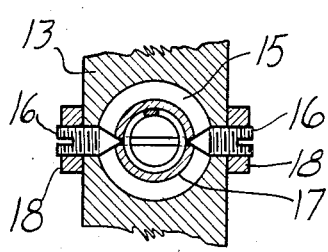
Fig. 3 is an enlarged partial sectional view along a line 2—2 of Figure 2.

In the drawing 1 represents the bed of a machinist's lathe and 2 is the usual face plate having a piece of work 3 mounted on said face plate. 4 is the carriage of the lathe which is usually mounted on the bed 1. Carriage 4 carries the tool post 5 which has the usual bolt 6 by means of which the tools or other devices are held in the slot 7 of the tool post 5. 8 is the holder part of my center testing indicator which holder has the cylindrical clamping part 9 shown with the slot 10 and the screw 11 by means of which said clamping part holds the sleeve 12. Journally mounted in said sleeve 12 is the frame 13 which is adjustably and movably held in position by means of the shouldered screw 14 as shown. Frame 13 has an aperture 15 in which is pivotally mounted by means of the pointed screws 16 the tubular member 17, as shown in Figure 3. Screws 16 are held in position by means of the lock nuts 18.

Slidably mounted in one end of tubular member 17 is the shouldered part 19 of a pin 20, the smaller part passing through an aperture in the end of tubular member 17 as shown, by means of which of tubular member 17 as shown, by means of which the pin 20 is held from passing out of the end of said tubular member 17. Said pin 20 is resiliently retained in the end of said tubular member 17 by means of the spring 22 one end of which fits into the slot 23 of the shouldered part 19 of the pin 20 and the other end of said spring 22 similarly fits into a slot 24 of a plug 25 which is force-fitted into said tubular member 17 as shown. The purpose of putting the ends of the spring 22 into the slots as shown is to keep the pin 20 from any undue rotating when the conical point 21 of the pin 20 touches the setting up marks on the piece of work 3 when said piece is rotated on the face plate 2.

Plug 25 has headed cylindrical part 26 which contacts with the end 27 of the plunger 28 of the dial gauge 29. Dial gauge 29 has a rod 30 projecting from it which passes through an aperture in frame 13 as shown where it is locked into position by means of the screw 31.

Figure 2:
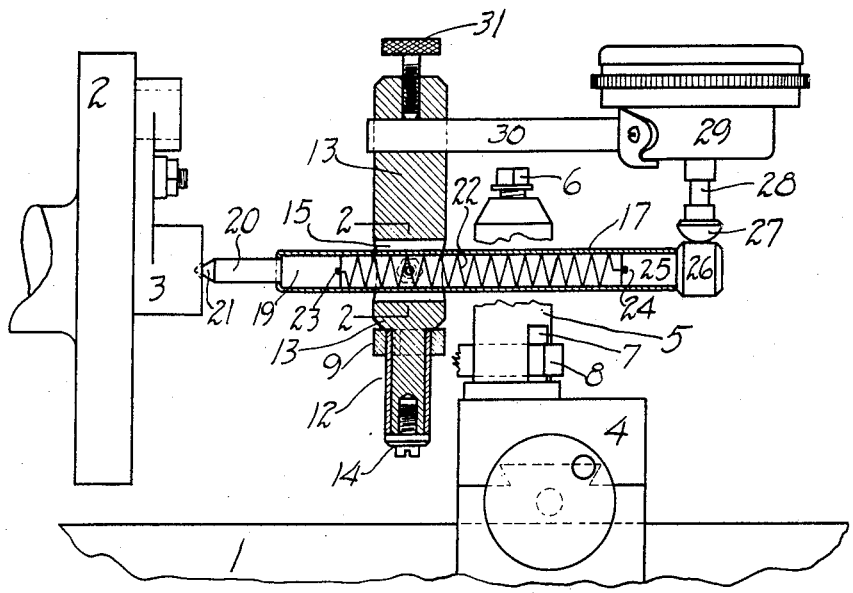
Fig. 2 is a front view of Figure 1 showing my center testing indicator in partial section along a line 1—1 of Fig. 1.

It is evident, from an examination of Figure 2, that if the bottom of the pricked conical mark shown on piece 3 is not on the absolute axis of rotation of the lathe spindle that carries the face plate 2, the point 21 will move up and down as well as sidewise and this up and down motion will be communicated to the dial gauge plunger 28 by means of head 26 of tubular member 17 and end 27 and be indicated by the dial hand shown. If it is absolutely on said center of rotation it is evident that no motion will be communicated to the hands and indicated on the dial.

Figure 1:
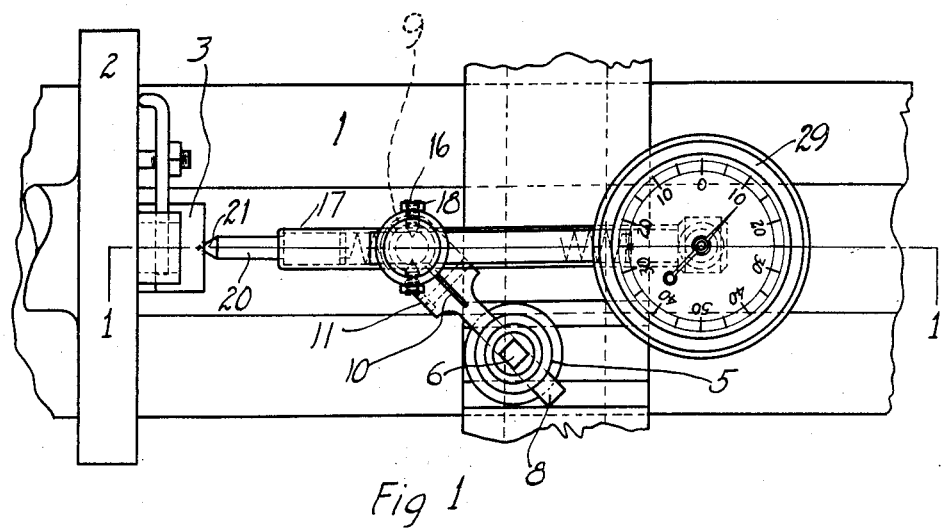
Fig. 1 is a top view of my center testing indicator mounted on an ordinary machinist lathe.

In practice, my center testing indicator may be used to test whether the live center of the rotating lathe head runs absolutely true as is well understood by any machinist, or it may also be used to set up a piece of work in which it is necessary to bore several apertures the sides of which must absolutely parallel with each other and a certain distance apart. In this last case the central points of the apertures are laid out the correct distance apart and prick punched at each point when one point is located in the face plate as shown in Figures 1 and 2 and the aperture bored. Then the second mark is similarly centrally located and the second aperture bored.

It will be understood of course, that while I have here described one form of my invention, I do not wish to limit myself to the exact form shown, but desire to have it taken in a sense illustrative of any and all the forms of same as will come fairly within the scope of the appended claims.

I claim:

1. In combination, a holding means, a frame having a plurality of apertures journally mounted in said holding means, a tubular member pivotally mounted in one of said apertures, a pin mounted in said tubular member, resilient means positioning said pin in said tubular member, and a dial gauge adjustably mounted in the other aperture of said frame and positioned to co-act with said tubular member.

2. In combination, a holding means, a frame having a plurality of apertures journally mounted in said holding means, a tubular member pivotally mounted in one of said apertures, a pin slidably mounted in said tubular member, resilient means positioning said pin in the end of said tubular member, and a dial gauge adjustably mounted in the other aperture of said frame positioned to co-act with said tubular member.

3. In combination, a holding means, a frame having a plurality of apertures journally mounted in said holding means, a tubular member having a flanged retaining end pivotally mounted in one of said apertures, a pin movably mounted in said tubular member, resilient means positioning said pin in said tubular member against said flanged retaining end, and a dial gauge adjustably mounted in the other aperture and positioned to co-act with said tubular member.

4. In combination, a holding means, a frame having a plurality of apertures journally mounted in said holding means, a tubular member having a flanged retaining end pivotally mounted in one of said apertures, a shouldered pin having a conical point movably mounted in said tubular member, resilient means positioning said pin in said tubular member against said flanged retaining end, and a dial gauge adjustably mounted in the other aperture and positioned to co-act with said tubular member.

THEODORE H. GEORGE.